(12) United States Patent
Grinnell (10) Patent No.: US 11,707,098 B2
(45) Date of Patent: Jul. 25, 2023

(54) COUPLER FOR COUPLING TO AN ARTICLE OF WEAR

(71) Applicant: Axon Enterprise, Inc., Scottsdale, AZ (US)

(72) Inventor: Edward Grinnell, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 232 days.

(21) Appl. No.: 17/039,700

(22) Filed: Sep. 30, 2020

(65) Prior Publication Data

US 2021/0093028 A1 Apr. 1, 2021

Related U.S. Application Data

(60) Provisional application No. 62/908,185, filed on Sep. 30, 2019.

(51) Int. Cl.
*F16M 13/04* (2006.01)
*A45F 5/02* (2006.01)
(Continued)

(52) U.S. Cl.
CPC .............. *A41D 27/08* (2013.01); *A41F 15/02* (2013.01); *F16M 11/041* (2013.01);
(Continued)

(58) Field of Classification Search
CPC ... A41D 27/08; A41F 15/02; A45F 2005/023; A45F 2005/026; A45F 2200/0533;
(Continued)

(56) References Cited

U.S. PATENT DOCUMENTS

| 567,195 | A | * | 9/1896 | Parramore | .............. A41F 11/02 24/465 |
| 1,056,020 | A | * | 3/1913 | Graham | .................. A41F 11/02 24/489 |
| 1,399,730 | A | * | 12/1921 | Seikichi | ................ A41F 19/005 24/470 |
| 4,308,647 | A | * | 1/1982 | Gillis | ...................... E04H 15/64 135/120.1 |

(Continued)

FOREIGN PATENT DOCUMENTS

KR 20-0304455 Y1 2/2003

OTHER PUBLICATIONS

Korean Intellectual Property Office, International Search Report & Written Opinion for International Application No. PCT/US2020/053626, dated Jan. 21, 2021, p. 1-8.

*Primary Examiner* — Jack W Lavinder
(74) *Attorney, Agent, or Firm* — Andrew Terajewicz; Justin Powley (57) ABSTRACT

A coupler for coupling to a provided article of wear comprises a base plate and a clip. The coupler may be configured to provide a mount interface on an article of wear for an accessory to mount to. The base plate may comprise one or more structures configured to engage one or more respective portions of the clip over the provided article of wear. The clip may be shaped to interlock with the structures of the base plate. The clip may engage the base plate in a series of actions. The series of actions may be repeated in reverse to disengage the clip from the base plate. The series of actions for disengaging the clip from the base plate may reduce a likelihood of the clip in being unintentionally decoupled from the base plate, thereby increasing a likelihood that the coupler remains coupled to an article of wear.

20 Claims, 3 Drawing Sheets

(51) Int. Cl.
*A41D 27/08* (2006.01)
*A41F 15/02* (2006.01)
*F16M 11/04* (2006.01)
*G03B 17/56* (2021.01)

(52) U.S. Cl.
CPC .......... *F16M 13/04* (2013.01); *G03B 17/561* (2013.01); *G03B 17/566* (2013.01); *A45F 5/02* (2013.01); *A45F 2200/0533* (2013.01); *Y10T 24/1394* (2015.01)

(58) Field of Classification Search
CPC ........ A45F 5/02; F16B 5/0642; F16B 5/0692; F16M 11/041; F16M 13/04; G03B 17/561; G03B 17/566; Y10T 24/1394
USPC ............ 24/3.12; 248/205.1, 221.12, 222.52, 248/222.41, 225.11
See application file for complete search history.

(56) References Cited

U.S. PATENT DOCUMENTS

| | | | | |
|---|---|---|---|---|
| 5,033,170 | A | * | 7/1991 | Ewert ........................ A41F 1/00 24/462 |
| 5,557,830 | A | * | 9/1996 | Davis ..................... A44B 99/00 24/113 MP |
| D445,625 | S | * | 7/2001 | Smith ............................ D6/607 |
| D770,125 | S | | 11/2016 | Patulski |
| D773,783 | S | | 12/2016 | Patulski |
| 9,568,144 | B2 | * | 2/2017 | Pernu ......................... A45F 5/02 |
| 11,178,939 | B2 | * | 11/2021 | Grinnell ............. A44B 17/0035 |
| 11,272,779 | B2 | * | 3/2022 | Grinnell ................. F16M 13/04 |
| 11,275,294 | B2 | * | 3/2022 | Grinnell ............... F16M 11/041 |
| 2008/0047110 | A1 | * | 2/2008 | Doyle ........................ A45F 5/02 24/3.12 |
| 2009/0213204 | A1 | | 8/2009 | Wong |
| 2011/0079619 | A1 | | 4/2011 | Lewis |
| 2016/0316900 | A1 | * | 11/2016 | Hanchett ................... A45F 5/02 |
| 2018/0235818 | A1 | | 8/2018 | Chen |
| 2019/0113058 | A1 | * | 4/2019 | Wine ................... A44B 99/005 |

\* cited by examiner

COUPLER FOR COUPLING TO AN ARTICLE OF WEAR

FIELD OF THE INVENTION

Embodiments of the present invention relate to a coupler for coupling to an article of wear.

BACKGROUND OF THE INVENTION

Public safety personnel, such as police officers and firefighters, use cameras to capture events, so that a video and/or audio record exist of what happened in an incident. These cameras may be mounted on vehicles such as cars and drones, and they may also be worn on the body as body worn cameras. Numerous mounting systems exist to mount cameras to personnel.

It is often useful or necessary to secure an item onto a sheet of material, such as a fabric or item of clothing. As one example, it can be useful or necessary for a law enforcement officer to secure a body camera to the officer's uniform shirt. Such a connection is preferably made without damaging or altering the shirt. To that end, connection mechanisms are sold that incorporate one or more magnets, and including a part that is placed inside the shirt. The parts of this mechanism are arranged in a manner so that magnetic attraction through the sheet material of the shirt holds the camera in place on the shirt.

One drawback of this mechanism is that the magnets must be very strong to hold a heavy camera in place. Also, lateral movement of the camera (sliding it along the surface of the shirt) can possibly dislodge the camera from the interior magnet. Finally, a magnetic mechanism can be painful if it closes on the user's finger, for example.

BRIEF DESCRIPTION OF THE DRAWINGS

Embodiments of the present invention will be described with reference to the drawing, wherein like designations denote like elements, and.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

A coupler (e.g., mount, clothing mount, etc.) according to various aspects of the present disclosure, may include a first part (e.g., base plate, base, etc.) and a second part (e.g., clip, loop, etc.). Each part may include physically separate, but engageable structures and portions. The engageable structures and portions may be configured to engage one another to couple the base plate with the clip. The base plate may releasably engage the clip over an article of wear, thereby coupling the base plate and the clip to the article of wear.

One or more components of a coupler may comprise one or more rigid, plastic materials, metal materials, and/or composite materials. A rigid material may include materials resistant to deformation under typical usage loads. The one or more rigid materials may include corrosion-resistant materials, UV resistant materials, and/or materials configured to withstand environmental factors. Rigid materials may include metals and metallic alloys (e.g., aluminum, steel, titanium, etc.), composites (e.g., fiberglass, carbon fiber, etc.), and plastics (e.g., polycarbonate/acrylonitrile butadiene styrene, polyether ether ketone, Nylon 6/6, etc.). The rigid materials may also be treated (e.g., heat-treated, galvanized, anodized) and/or painted (e.g., powder-coated, e-coated, etc.).

An article of wear may include articles configured to be worn by a person or animal. For example, an article of wear may include a shirt, a jacket, a hat, a vest, a uniform, pants, gloves, shoes, etc. An article of wear may comprise a range of thicknesses, such as between 0.005 in to 0.150 in (0.127 mm to 3.810 mm). An article of wear may comprise various materials, such as stiff materials, flexible materials, elastic materials, synthetic materials, natural materials, and combinations thereof.

A base plate may be configured to couple with a provided accessory. For example, a base plate may include a mount interface (e.g., a connector, a receiver, a coupler, etc.) configured to releasably receive an accessory. An accessory may include a body worn camera, a radio, a flashlight, an ammunition magazine, or any other item desired to be mounted to an article of wear. A base plate may be positioned on a first side of the article of wear and engage a clip positioned on a second side of the article of wear. An article of wear may be disposed between the base plate and the clip. Engagement of the clip with the base plate over the article of wear may couple the base plate to the article of wear. Thus, an accessory may be coupled to an article of wear via the base plate without a need to alter (e.g., cut, sew, modify, etc.) the article of wear.

A base plate may be configured to releasably couple with a clip over a provided article of wear. A base plate may comprise structures (e.g., tabs, lips, ledges, blocks, steps, etc.) that are configured to engage (e.g., interlock, overlap, etc.) respective portions of a clip to limit movement of the clip relative to the base plate. The structures may be configured to engage respective portions of the clip in multiple directions, thereby limiting (e.g., obstructing, preventing, etc.) movement of the clip in the multiple directions.

A clip may be configured to releasably couple with a base plate over an article of wear. A clip may comprise portions that are configured to engage respective structures of the base plate to limit movement of the base plate relative to the clip. The portions may be configured to engage respective structures of the base plate in multiple directions, thereby limiting movement of the base plate in the multiple directions.

A clip may engage a base plate in a series of actions. The series of actions may comprise engaging a portion of the clip with a structure of the base plate, rotating the clip relative to the base plate to interlock the clip with additional structures of the base plate, and sliding (e.g., translating) the clip relative to the base plate, such that each portion of the clip is engaged with (e.g., interlocked with) one or more structures of the base plate. The series of actions may be repeated in reverse to disengage the clip from the base plate. The series of actions for disengaging the clip from the base plate may improve the reliability of a coupler coupling to an article of wear. The series of actions for disengaging the clip from the base plate may reduce a likelihood of the clip being unintentionally removed from the base plate. The series of actions for disengaging a coupler coupled to an article of wear may reduce a likelihood of the coupler being unintentionally decoupled from the article of wear.

Figure 1A:
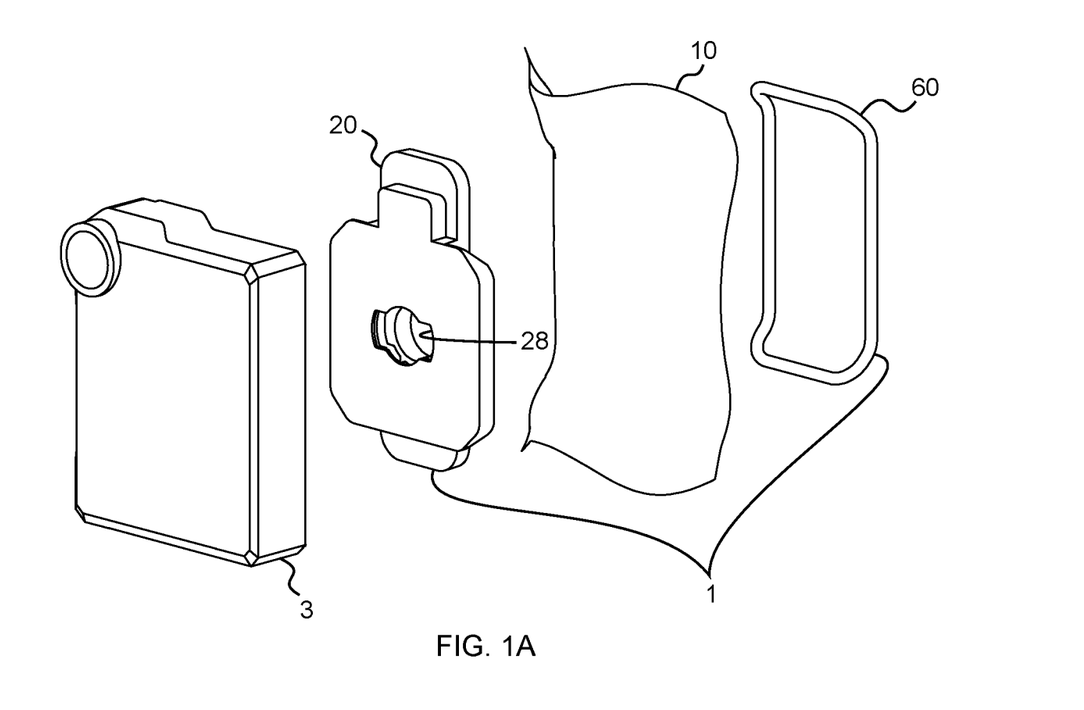
FIG. 1A is a front perspective exploded view of a coupler, in accordance with various aspects of the present disclosure.
Figure 1B:
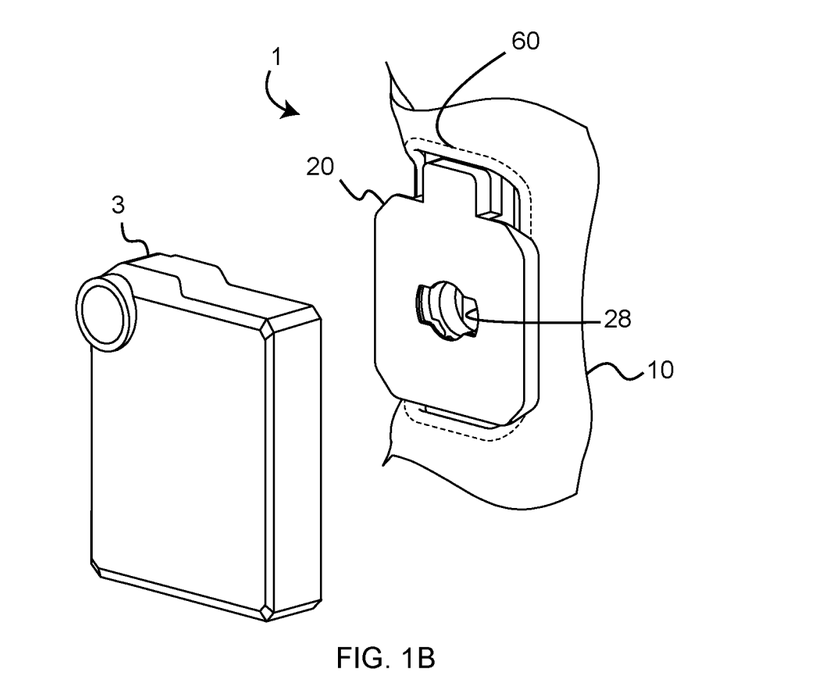
FIG. 1B is a front perspective view of the coupler of FIG. 1A coupled to an article of wear in accordance with various aspects of the present disclosure.

FIG. 1A shows an exploded view of a coupler 1, and FIG. 1B shows an assembled view of coupler 1 according to various embodiments disclosed herein. Coupler 1 may be configured to releasably couple to an article of wear, such as article of wear 10. An accessory, such as camera 3, may be configured to releasably (e.g., removably, etc.) attach (e.g., couple, etc.) to coupler 1.

In various embodiments, coupler 1 may comprise two physically separate, but engageable parts. For example, coupler 1 may include a base plate, such as base plate 20 (e.g., first part, base, etc.) and a clip, such as clip 60 (e.g., loop, retainer, etc.). Each of base plate 20 and clip 60 may comprise one or more rigid materials as disclosed previously herein.

In various embodiments, a geometry of coupler 1 may enable clip 60 to releasably engage base plate 20 over a range of thin and deformable materials, such as a provided article of wear 10. Base plate 20 may be configured to engage clip 60 over article of wear 10, thereby providing a base with which a provided accessory, such as camera 3, may attach. Article of wear 10 may comprise a variety of articles ranging in thickness and composition. For example, a thickness of article of wear 10 may include a range of thicknesses, such as between 0.005 in to 0.150 in (0.127 mm to 3.810 mm). Article of wear 10 may comprise a variety of materials, such as textiles, foams, elastomers, and the like. Article of wear 10 may include pants, jackets, shirts, hats, overalls etc. Article of wear 10 may also include soft goods that are not worn on a person, such as fabric of a tent, parachute cloth, and other similar soft goods.

In various embodiments, base plate 20 may be disposed adjacent a first surface of article of wear 10, and clip 60 may be disposed adjacent a second surface of article of wear 10, opposite the first surface. The first surface may be an outer surface of article of wear 10 (e.g., a surface facing away from the wearer). The second surface may be an inner surface of article of wear 10 (e.g., a surface facing toward the wearer). Clip 60 may be configured to couple to base plate 20 over article of wear 10 without damaging article of wear 10. Article of wear 10 may conform to a shape of base plate 20 and clip 60.

In various embodiments, camera 3 may couple with coupler 1 via a mount interface of base plate 20, such as mount interface 28. Camera 3 may be removably coupled to coupler 1, while coupler 1 remains coupled to article of wear 10. Camera 3 may be removeable from coupler 1, without decoupling coupler 1 from article of wear 10. Coupling of camera 3 with coupler 1 may prevent clip 60 from separating from base plate 20, thereby securing coupler 1 to article of wear 10. Coupling of camera 3 with base plate 20 may prevent clip 60 from attaching to base plate 20, thereby preventing coupler 1 from coupling with article of wear 10.

Figure 2A:
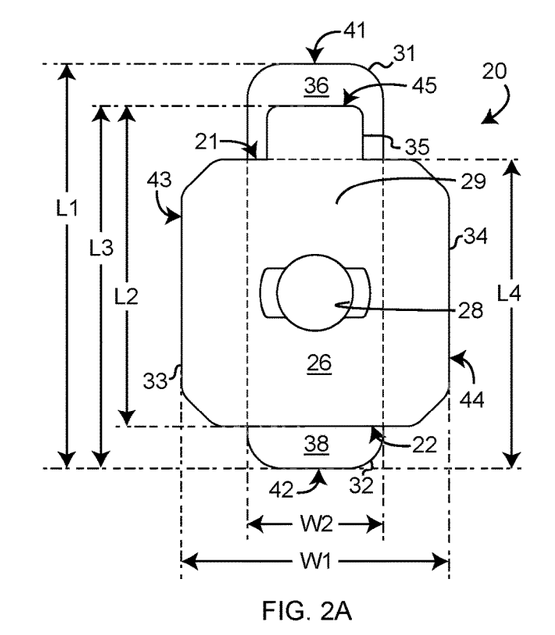
FIG. 2A is a top view of a base plate in accordance with various aspects of the present disclosure.
Figure 2B:
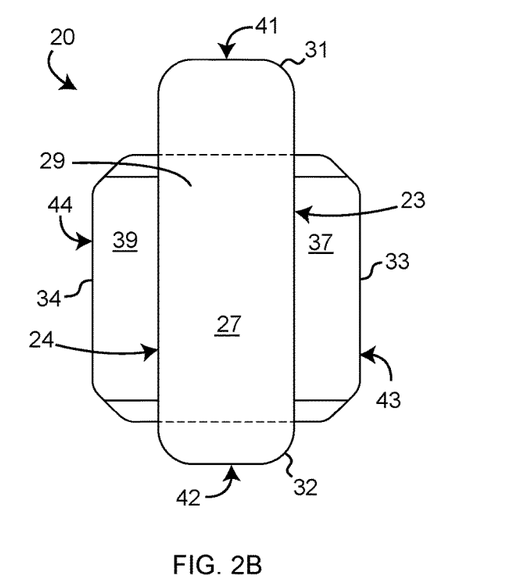
FIG. 2B is a bottom view of the base plate of FIG. 2A in accordance with various aspects of the present disclosure.

FIGS. 2A-2B show top and bottom views of base plate 20, respectively. Base plate 20 may comprise a unitary part, or base plate 20 may be formed of one or more parts. In various embodiments, base plate 20 may comprise a center region 29. Center region 29 may provide a surface on which mount interface 28 is disposed. Center region 29 may provide a rigid, fixed region about which clip 60 may be translated to transition coupler 1 between a locked state and an unlocked state. Center region 29 may extend between a first wall 21 (e.g., first center region surface 21) and a second wall 22 (e.g., second center region surface 22) that is opposite first wall 21. First wall 21 and second wall 22 may be parallel with one another. Center region 29 may extend between a third wall 23 (e.g., third center region surface 23) and a fourth wall 24 (e.g., fourth center region surface 24) that is opposite third wall 23. Third wall 23 and fourth wall 24 may be parallel with one another. Third wall 23 and a fourth wall 24 may connect first wall 21 and second wall 22. First wall 21, second wall 22, third wall 23, and fourth wall 24 may include a rectangular cross section. Third wall 23 may be perpendicular with first wall 21. Third wall 23 may be perpendicular with second wall 22. Fourth wall 24 may be perpendicular with first wall 21. Fourth wall 24 may be perpendicular with second wall 22. Base plate 20 may be symmetric about a plane of symmetry that bisects first wall 21 of base plate 20 and second wall 22 of base plate 20.

In various embodiments, center region 29 may extend between a top surface 26 and a bottom surface 27 that is opposite top surface 26. Top surface 26 may be parallel with bottom surface 27. Top surface 26 may be smooth to facilitate coupling with camera 3. Top surface 26 may be perpendicular with first wall 21, second wall 22, third wall 23, and/or fourth wall 24. Top surface 26 may join first wall 21, second wall 22, third wall 23, and fourth wall 24. In accordance with first wall 21, second wall 22, third wall 23, fourth wall 24, top surface 26, and/or bottom surface 27, center region 29 may comprise a three-dimensional portion of base plate 20.

Top surface 26 may comprise a mount interface, such as mount interface 28, that is configured to receive camera 3. Mount interface 28 may include a connector, receiver, magnet, ferrous material, suction cup, smooth surface, or other interface configured to releasably couple with a complementary interface of camera 3. For example, mount interface 28 may comprise a receiver for releasably coupling with a mating connector of an item. Mount interface 28 may include a connector for releasably coupling with a mating receiver of camera 3. As a further example, mount interface 28 may comprise a ferrous material for coupling with a magnetic portion of camera 3.

In various embodiments, base plate 20 may include one or more structures (e.g., tabs, ledges, lips, blocks, protrusions, wings, etc.) configured to engage one or more portions of clip 60. The one or more structure may be configured to limit movement of clip 60 when clip 60 is coupled to base plate 20. The one or more structures of base plate 20 may limit movement of clip 60 in multiple directions. The one or more structures may each extend from center region 29 of base plate 20.

In various embodiments, a structure may be configured to limit translation of a clip in a first translational direction and not limit translation of the clip in a second translational direction. The structure may comprise a first surface configured to limit translation of the clip in the first translational direction. The structure may lack another surface to prevent translation in the second translational direction. The structure may be open in the second translational direction. The second translational direction may be one or more of opposite the first translational direction and a direction in which the structure is configured to receive the clip. For example, the structure may comprise a concave portion (e.g., undercut, overhang, etc.) configured to receive the clip. The concave portion may comprise a surface configured to limit translation of the clip in a direction toward the surface and enable translation of the clip in one or more directions away from the concave portion. The concave portion may partially enclose (e.g., encircle) a portion of the clip and the portion of the clip may also be partially unobstructed by the structure.

In various embodiments, a structure may form a concave portion with center region 29. The concave portion may comprise one of an overhang and an undercut. An overhang may comprise a surface oriented a direction opposite a direction in which a reference surface is oriented. An undercut may comprise a surface oriented in a same direction as the reference surface. For example, a first structure may comprise an undercut formed in part by first upper surface 36 oriented in a same direction as a reference surface comprising top surface 26. A second structure may comprise an overhang formed in part by third lower surface 37 oriented in a direction opposite the reference surface comprising top surface 26. The undercut and overhang may be respectively further defined relative to at least one respective wall of center region 29. The undercut and overhang may be formed by at least one of a surface of a wall of center region 29 or a surface of step 35 as further discussed below.

In various embodiments, coupler 1 comprises one or more structures. The one or more structures may each extend from center region 29. The one or more structures may each form an overhang or an undercut with center region 29 relative to a pull direction normal to top surface 26. For example, base plate 20 may comprise one or more undercut structures, wherein each undercut structure of the one or more undercut structures forms a respective undercut with center region 29. Alternately or additionally, base plate 20 may comprise one or more overhanging (e.g., overhang) structures, wherein each overhang structure of the one or more overhanging structures provides an overhang with center region 29.

In various embodiments, an undercut structure may be configured to limit movement of clip 60 in a first direction, and an overhanging structure may be configured to limit movement of clip 60 in a second direction, that is opposite the first direction. The undercut structure may be configured to receive (e.g., not limit translation of) clip 60 in the second direction. The overhang structure may be configured to receive clip 60 in the first direction. In combination, a pair of structures comprising an undercut structure and an overhang structure may prevent movement along an axis determined in accordance with the first direction and the second direction. A single structure of the pair of structures alone may be insufficient to prevent translation of the clip in at least one direction along the axis. For example, base plate 20 may comprise a first undercut structure, such as first tab 31, and a second undercut structure, such as second tab 32. First tab 31 and second tab 32 may be configured to limit movement of clip 60 in a first direction. The first direction may be toward (e.g., into, in the direction of, etc.,) a respective surface of each of first tab 31 and second tab 32. Base plate 20 may comprise a first overhanging structure, such as third tab 33 and a second overhanging structure, such as fourth tab 34. Third tab 33 and fourth tab 34 may be configured to limit movement of clip 60 in a second direction that is opposite the first direction.

In various embodiments, first tab 31 may be positioned adjacent first wall 21. First tab 31 may extend from first wall 21 and terminate in an end (e.g., wall, terminus, etc.) such as first end 41. First end 41 may be parallel with first wall 21. First tab 31 may include a first upper surface 36. First upper surface 36 may be sub-flush with top surface 26. First upper surface 36 may be parallel with top surface 26. First upper surface 36 may form a right angle, acute angle, or obtuse angle with first end 41. In various embodiments, first upper surface 36 may form a right angle, acute angle, or obtuse angle with first wall 21. First tab 31 may comprise a first lower surface that is opposite first upper surface 36. The first lower surface may be coplanar with bottom surface 27 of base plate 20.

In various embodiments, second tab 32 may be positioned adjacent second wall 22. Second tab 32 may extend from second wall 22 and terminate in an end, such as second end 42. Second tab 32 may extend from central region 29 in a first direction opposite a second direction in which first tab 31 extends from central region 29. Second end 42 may be parallel with second wall 22. Second tab 32 may include an upper surface, such as second upper surface 38. Second upper surface 38 may be sub-flush with top surface 26 of base plate 20. Second upper surface 38 may be parallel with top surface 26 of base plate 20. Second upper surface 38 may form a right angle, acute angle, or obtuse angle with second end 42. Second upper surface 38 may form a right angle, acute angle, or obtuse angle with second wall 22. Second upper surface 38 may be coplanar with first upper surface 36 of first tab 31. Second upper surface 38 may be co-planar with first upper surface 36. Second tab 32 may comprise a second lower surface that is opposite second upper surface 38. The second lower surface may be flush with bottom surface 27 of base plate 20.

In various embodiments, third tab 33 may be positioned adjacent third wall 23. Third tab 33 may be oriented perpendicular to first tab 31 and second tab 32. Third tab 33 may extend from third wall 23 and terminate in an end, such as third end 43. Third end 43 may be parallel with third wall 23. Third tab 33 may include a third upper surface that is coplanar with top surface 26 of base plate 20. The third upper surface of third tab 33 may be smooth and flush with top surface 26 to facilitate coupling with camera 3. Third tab 33 may include a lower surface, such as third lower surface 37. Third lower surface 37 may be opposite top surface 26. Third lower surface 37 may be sub-flush with bottom surface 27. Third lower surface 37 may be parallel with bottom surface 27. Third lower surface 37 may form a right angle, acute angle, or obtuse angle with third wall 23. Third lower surface 37 may form a right angle, acute angle, or obtuse angle with third end 43.

In various embodiments, fourth tab 34 may be positioned adjacent fourth wall 24. Fourth tab 34 may be oriented perpendicular to first tab 31 and second tab 32. Fourth tab 34 may be opposite third tab 33. Fourth tab 34 may extend from fourth wall 24 and terminate in an end, such as fourth end 44. Fourth tab 34 may extend from central region 29 in a third direction opposite a fourth direction in which third tab 33 extends from central region 29. Fourth end 44 may be parallel with fourth wall 24. Fourth tab 34 may include a fourth upper surface that is coplanar with top surface 26. Fourth upper surface of fourth tab 34 may be smooth and coplanar with top surface 26 to facilitate coupling with camera 3. Fourth tab 34 may include a lower surface, such as fourth lower surface 39. Fourth lower surface 39 may be opposite the fourth upper surface. Fourth lower surface 39 may be sub-flush with bottom surface 27 of base plate 20. Fourth lower surface 39 may be parallel with bottom surface 27. Fourth lower surface 39 may form a right angle, acute angle, or obtuse angle with fourth wall 24. Fourth lower surface 39 may form a right angle, acute angle, or obtuse angle with third end 43. Fourth lower surface 39 may be co-planar with third lower surface 37.

In various embodiments, surfaces of different structures may be co-planar. For example, third lower surface 37 may be co-planar with first upper surface 36. Fourth lower surface 39 may alternately or additionally be co-planar with second upper surface 38. In embodiments, the extent to which the structures are co-planar may be limited to such surfaces, such that one or more pairs of structures may be non-coplanar in a direction perpendicular to the surfaces, aside from the surfaces themselves.

In various embodiments, surfaces of different structures may be non-coplanar. For example, a pair of structures may provide a pair of surfaces oriented in different directions along a dimension (e.g., depth) of a coupler. A first plane in which a first surface of a first structure of the different structures is disposed may be offset along the dimension relative to a second plane in which a second surface of a second structure of the different structures may be disposed. The first surface and second surface may be disposed parallel to each other. The first surface may comprise one of a lower surface and an upper surface and the second surface may comprise the other of the lower surface and the upper surface, different from the first surface. In embodiments, the offset may be less than a thickness of the clip along the dimension in a locked state of a coupler comprising the clip and the first structure and the second structure. For example, third lower surface 37 may be non-coplanar with first upper surface 36. An offset between third lower surface 37 and first upper surface 36 along a depth of base plate 20 (e.g., in a direction perpendicular to the view provided in FIG. 2A) may be less than a depth of clip 60 (e.g., in a direction perpendicular to the view provided in FIG. 3A. The offset may be determined along a middle portion of clip 60, such as middle portion 63 (with brief reference to FIG. 3A). In accordance with an offset between non-coplanar position between the pair of surfaces, the surfaces may be configured to securely limit translation of clip 60 upon engagement of the pair of surfaces with different portions of clip 60.

In various embodiments, a length of base plate 20 may comprise a distance between first end 41 and second end 42. The length of base plate 20 may be between 2 inches and 2.5 inches (5.1 centimeters and 6.4 centimeters), between 2.5 inches and 3 inches (6.4 centimeters and 7.6 centimeters), between 3 inches and 3.5 inches (7.6 centimeters and 8.9 centimeters), 3.5 inches and 4 inches (8.9 centimeters and 10.2 centimeters), between 4 inches and 5 inches (10.2 centimeters and 12.7 centimeters), between 2 and 5 inches (5.1 centimeters and 12.7 centimeters), or any other suitable dimension.

In various embodiments, a width of base plate 20 may comprise a distance between third end 43 and fourth end 44. The width of base plate 20 may be between 2 inches and 2.5 inches (5.1 centimeters and 6.4 centimeters), between 2.5 inches and 3 inches (6.4 centimeters and 7.6 centimeters), between 3 inches and 3.5 inches (7.6 centimeters and 8.9 centimeters), 3.5 inches and 4 inches (8.9 centimeters and 10.2 centimeters), between 4 inches and 5 inches (10.2 centimeters and 12.7 centimeters), between 2 and 5 inches (5.1 centimeters and 12.7 centimeters), or any other suitable dimension. The width of base plate 20 may be less than the length of base plate 20.

In various embodiments, a thickness of base plate 20 may comprise a distance between top surface 26 and bottom surface 27. The thickness of base plate 20 may be between 0.1 inches and 0.15 inches (0.25 centimeters and 0.38 centimeters), between 0.15 inches and 0.2 inches (0.38 centimeters and 0.51 centimeters), between 0.2 inches and 0.25 inches (0.51 centimeters and 0.64 centimeters), 0.25 inches and 0.3 inches (0.64 centimeters and 0.76 centimeters), between 0.3 inches and 0.5 inches (0.76 centimeters and 1.27 centimeters), between 0.1 inches and 0.5 inches (0.25 centimeters and 1.27 centimeters), or any other suitable dimension. The thickness of base plate 20 may be less than each of the length of base plate 20 and the width of base plate 20.

In various embodiments, base plate 20 may include a fifth structure adjacent to the first undercut structure for limiting movement of clip 60 relative to base plate 20 when clip 60 is engaged with base plate 20. For example, base plate 20 may include a step 35 adjacent to first wall 21 and first tab 31. Step 35 may comprise a block physically integrated with one or more of first tab 31 or central region 29. Step 35 may extend between first upper surface 36 of first tab 31 and top 26 of base plate 20. An upper surface of step 35 may be coplanar with, sub-flush with, or extend beyond, top surface 26. In various embodiments, an upper surface of step 35 may be smooth and flush with top surface 26 to facilitate coupling with a provided item. An upper surface of step 35 may be parallel with upper surface 36 of first tab 31. Step 35 may terminate in an end, such as fifth end 45 (e.g., first step end). Fifth end 45 may be proximate first end 41 of first tab 31. Fifth end 45 may be parallel with first end 41. Fifth end 45 may form a right angle, acute angle, or obtuse angle with upper surface 36 of first tab 21. Fifth end 45 may form a right angle, acute angle, or obtuse angle with an upper surface of step 35.

In various embodiments, first upper surface 36 may be different from second upper surface 38 in accordance with step 35. Second tab 32 may lack a step or other physical part equivalent to step 35. Second tab 32 may comprise a concave portion and exclude a step. First tab 31 and second tab 32 may be otherwise symmetrical relative to center region 29, aside from step 35. For example, first tab 31 and second tab 32 may extend a same respective distance from center region. A width of first tab 31 may be equal to a width of second tab 32. In accordance with the integration of step 35 with first tab 31 and a lack of such a step for second tab 32, clip 60 may interlock with more of first tab 31 than second tab 32, thereby enabling clip 60 to translate over more of first tab 31 than second tab 32 in a locked state and a transition state of coupler 1.

In embodiments, a structure may define an undercut structure or an overhang structure relative to a common surface. For example, first tab 31 may correspond to the first undercut structure in accordance with first upper surface 36 being sub-flush with top surface 26. Second tab 32 may correspond to the second undercut structure in accordance with second upper surface 38 being sub-flush with top surface 26. Third tab 33 may correspond to the first overhang structure in accordance with the third upper surface of third tab 33 being flush with top surface 26. Fourth tab 34 may correspond to the second overhang structure in accordance with the fourth upper surface of fourth tab 34 being flush with top surface 26. Alternately or additionally, first tab 31 may correspond to the first undercut structure in accordance with the first lower surface being flush with bottom surface 27; second tab 32 may correspond to the second undercut structure in accordance with second lower surface being flush with bottom surface 27; third tab 33 may correspond to the first overhang structure in accordance with third lower surface 37 of third tab 33 being sub-flush with bottom surface 27; and/or fourth tab 34 may correspond to the second overhang structure in accordance with fourth lower surface 39 of fourth tab 34 being sub-flush with bottom surface 27.

Figure 3A:
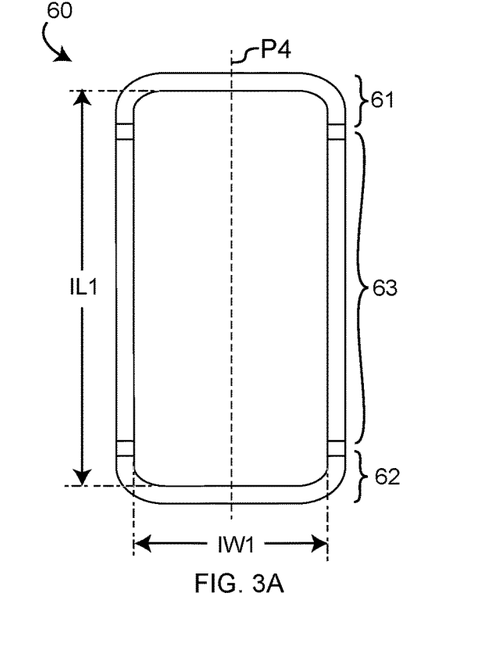
FIG. 3A is a top view of a clip in accordance with various aspects of the present disclosure.
Figure 3B:
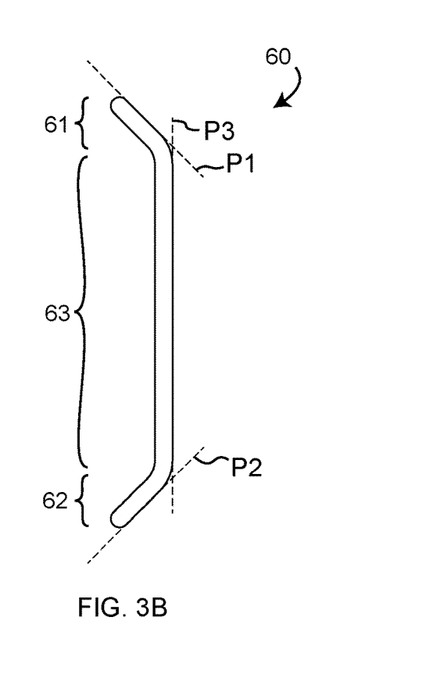
FIG. 3B is a side view of the clip of FIG. 3A in accordance with various aspects of the present disclosure.

FIGS. 3A-3B illustrate a clip 60 that is configured to releasably engage base plate 20. Clip 60 may comprise multiple portions that are each configured to engage respective structures of base plate 20 (e.g., first tab 31, second tab 32, third tab 33, fourth tab 34, fifth tab 35, etc.) to releasably couple base plate 20 to article of wear 10. A shape of clip 60 may complement a shape of base plate 20, such that portions of clip 60 engage complementary structures of base plate 20 to limit movement of clip 60 relative to base plate 20.

Clip 60 may comprise a unitary body or multiple components joined together. Clip 60 may comprise a rigid material as discussed previously herein. The material may be hardened via methods such as heat treatment. The rigid material may be treated to resist oxidation and/or include a composition that resists oxidation, such as a stainless steel. Clip 60 may be formed by forming (e.g., bending, etc.) a ductile material into a desired shape. For example, clip 60 may comprise a rod or tube that is formed into the desired shape. The ends of the rod or tube may be joined (e.g., welded, etc.) together to close the desired shape.

In various embodiments, a shape of clip 60 may comprise a loop. A loop may be a shape that is geometrically produced by sweeping a closed profile about a curve. The closed profile of the loop may be round, square, hexagonal or any other closed shape. A diameter of the closed profile may be a range of diameters from 0.063 inches to 0.25 inches (1.59 mm to 6.35 mm). A height of the closed profiled may be a range of heights from 0.063 inches to 0.25 inches (1.59 mm to 6.35 mm). The section of the closed profile may vary about the sweep of the curve. For example, a portion of the curve may have a circular section while another portion of the curve may have a hexagonal section. The curve may have a discrete start point and a discreet end point, such that the loop forms an open loop. As another example, the curve may have a start point coincident with an end point, such that the loop forms a closed loop.

In various embodiments, clip 60 may comprise multiple portions configured to engage base plate 20. A region of each portion of clip 60 may be tangent with a discrete plane. For example, clip 60 may include a first portion 61, a second portion 62, and a middle portion 63 connecting first portion 61 and second portion 62. First portion 61, second portion 62, and middle portion 63 may each be tangent with a discrete plane. An elongate region of first portion 61, an elongate region of second portion 62, and an elongate region of middle portion 63 may each be tangent with a plane. First portion 61, second portion 62, and third portion 63 may each extend in different directions relative to one another. For example, a first elongate region of first portion 61 may be tangent with a first tangent plane P1, a second elongate region of second portion 62 may be tangent with a second tangent plane P2, and third elongate region of middle portion 63 may be tangent with a third tangent plane P3. The first tangent plane P1, the second tangent plane P2, and the third tangent plane P3 may each be orthogonal to a fourth plane P4. For example, the fourth plane P4 may comprise a plane from which the side view of clip 60 is illustrated in FIG. 3B. The first tangent plane P1 and the second tangent plane P2 may each intersect the third tangent plane P3 at equal and opposite angles with one another. In embodiments, the first tangent plane P1 may be parallel with the second tangent plane P2.

Clip 60 may have a closed profile when viewed from the side (e.g., as shown in FIG. 3B). Clip 60 may have an open profile when viewed from the top (e.g., as shown in FIG. 3A). In various embodiments, clip 60 may include one or more planes of symmetry. For example, first portion 61 may be symmetric with second portion 62 over a first plane of symmetry, which bisects middle portion 63. A second plane of symmetry may bisect first portion 61, second portion 62, and middle portion 63.

In various embodiments, one or more dimensions of clip 60 may be sized to cooperate with base plate 20. An internal dimension of clip 60 may be a dimension defined by a normal distance between two points each tangent with a surface of clip 60, wherein a line between the two points does not intersect the body of clip 60. For example, an internal length may be a length defined by a normal distance between two points each tangent with a surface of clip 60, wherein a line between the two points does not intersect the body clip 60. An internal length IL1 from a first elongate region of first portion 61 to a second elongate region of second portion 62 may be less than a length L1 from first end 41 to second end 42. The internal length IL1 may be equal to or greater than a second length L2 from second wall 22 to fifth end 45 of step 35. The internal length IL1 may be less than a third length L3 from second end 42 to fifth end 45 of step 35. The internal length IL1 may be equal to or greater than a fourth length L4 from second end 42 to first wall 21. An internal width IW1 of first portion 61, second portion 62, and/or third portion 63 may be less than a width W1 from third end 43 to fourth end 44 of base plate 20. The internal width IW1 of first portion 61, second portion 62, and/or third portion 63 may be less than a second width W2 from third wall 23 to fourth wall 24. Accordingly, and in embodiments according to various aspects of the present disclosure, the inner length IL1 of clip 60 may be less than the length L1 of base plate 20 and the inner width IW1 of clip 60 may be less than the width W1 of base plate 20. Despite such relative dimensions, clip 60 may overlap one or more structures of base plate 20 in accordance with a respective geometry of clip 60 and base 20. Clip 60 may be provided in a locked state of coupler 1 with base plate 20 in which the width is aligned with the inner width and the length is aligned with the inner length. Particularly and despite such relative dimensions, each portion of one or more portions of clip 60 (e.g., first portion 61) may encircle a respective, corresponding structure of base plate 20 in accordance with a respective geometry of clip 60 and base 20.

In various embodiments, clip 60 may comprise a loop thickness. A loop thickness may be a thickness defined by a height or diameter of the profile of the loop as discussed previously herein. A distance between top surface 26 of base plate 20 and first upper surface 36 of first tab 31 may be equal to or greater than a loop thickness of first portion 61 of clip 60 to facilitate coupling with camera 3. A distance between top surface 26 of base plate 20 and second upper surface 38 of second tab 32 may be equal to or greater than a loop thickness of second portion 62 of clip 60 to facilitate coupling with camera 3. A distance between bottom surface 27 of base plate 20 and third lower surface 37 of third tab 33 may be equal to or greater than a loop thickness of middle portion 63. A distance between bottom surface 27 of base plate 20 and fourth lower surface 39 of fourth tab 34 may be equal to or greater than a loop thickness of middle portion 63. A width between third end 43 and third wall 33 may be equal to, less than, or greater than a loop thickness of middle portion 63. A width between fourth end 44 and fourth wall 34 may be equal to, less than, or greater than a loop thickness of middle portion 63. A width between third end 43 and fourth end 44 may be equal to or greater than a width of middle portion 63.

In various embodiments, a coupler may transition between multiple states (e.g., configurations). For example, a coupler may transition from a first state to a second state to a third state. The first state may comprise a first physical state, the second state may comprise a second physical state, and the third state may comprise a third physical state. The second state may be different from the first state and the third state. The third state may be different from the first state and the second state. One or more of a relative position and orientation of a same element or feature of the coupler may differ between the first state, the second state, and the third state.

Figure 4A:
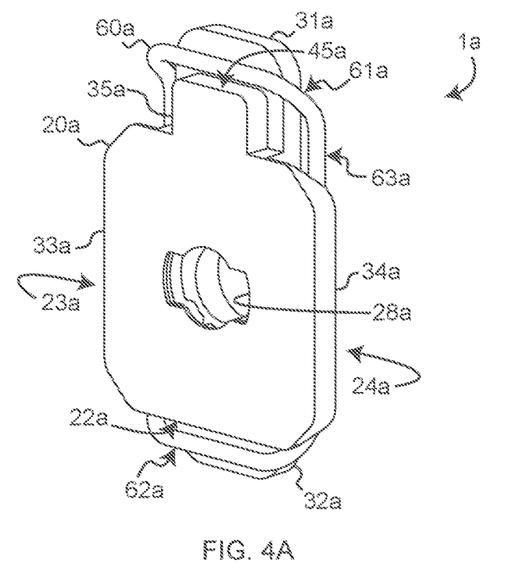
FIG. 4A is a front perspective view of a coupler in a first state in accordance with various aspects of the present disclosure.
Figure 4B:
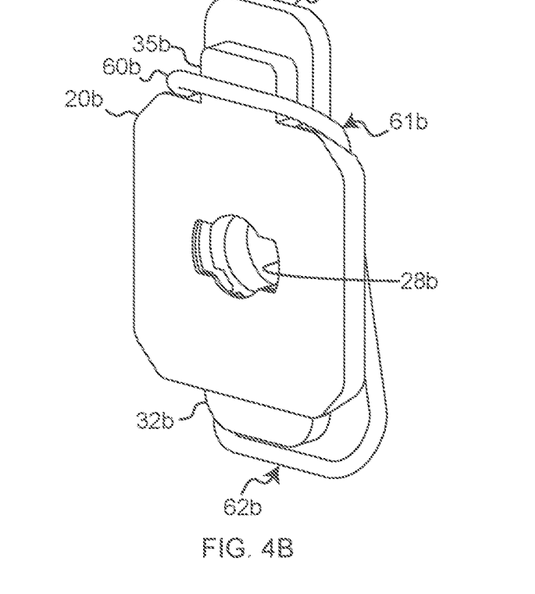
FIG. 4B is a front perspective view of a coupler in a second state in accordance with various aspects of the present disclosure.
Figure 4C:
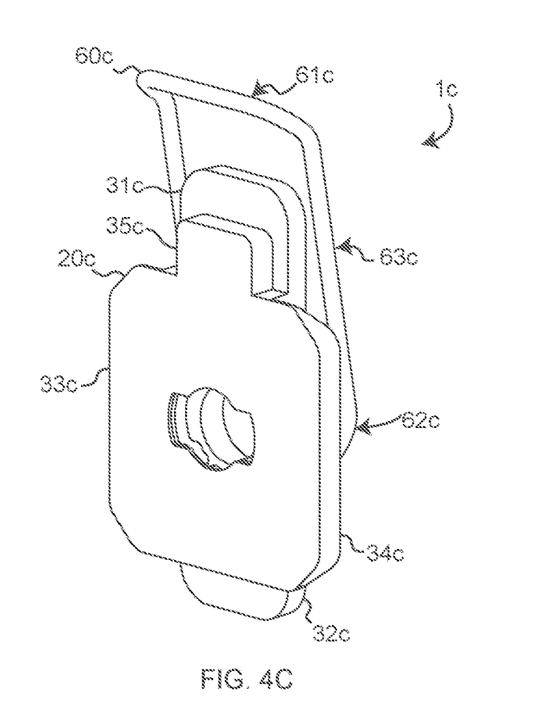
FIG. 4C is a front perspective view of a coupler in a third state in accordance with various aspects of the present disclosure.

For example, and in accordance with various aspects of the present disclosure, FIG. 4A shows a coupler, such as coupler 1a, in a locked (e.g., fully engaged, restricted, etc.) state, FIG. 4B shows a coupler, such as coupler 1b, in a transition (e.g., partially engaged, partially disengaged, etc.) state, and FIG. 4C shows a coupler, such as coupler 1c, in an unlocked (e.g., disengaged, free, etc.) state. In embodiments, coupler 1a may correspond with coupler 1b in a locked state or coupler 1c in a locked state. Coupler 1b may correspond with coupler 1a in a transition state or coupler 1c in a transition state. Coupler 1c may correspond with coupler 1a in an unlocked state or coupler 1b in an unlocked state. One or more elements or features of coupler 1a may correspond with one or more elements or features of coupler 1b or coupler 1c. For the coupler illustrated in FIG. 4B, corresponding elements or features are referred to using similar reference numerals under the "xxb" series of reference numerals, rather than the "xxa" as used in the embodiment of FIG. 4A, whereas for the coupler illustrated in FIG. 4C, corresponding elements or features are referred to using similar reference numerals under the "xxc" series of reference numerals.

In various embodiments, a coupler may transition from an unlocked state to a locked state. For example, coupler 1c, shown in an unlocked state, may transition to a locked state (e.g., as shown in coupler 1a). In transitioning from an unlocked state to a locked state, a coupler may pass through a transition state. For example, coupler 1c may transition through a transition state (e.g., as shown in coupler 1b) before reaching a locked state.

Referring to FIG. 4A, first portion 61a, second portion 62a, and middle portion 63a of clip 60a are each configured to engage structures of base plate 20a to releasably couple base plate 20a to an article of wear. The geometry of clip 60a complements the geometry of base plate 20a, such that the portions of clip 60a engage complementary structures of base plate 20a to limit movement of clip 60a relative to base plate 20a.

In various embodiments, in a locked state, middle portion 63a may be adjacent third tab 33a and fourth tab 34a. Clip 60a may be rotated and translated to disengage clip 60a from base plate 20a from the locked state. In a locked state, clip 60a may be rotated relative to base plate 20a to disengage clip 60a from base plate 20a. In a locked state, a first portion of clip 60a may engage one or more first structures of base plate 20a, a second portion of clip 60a may engage one or more second structures of base plate 20a, and a third portion of clip 60a may engage one or more third structures of base plate 20a. Coupler 1a may comprise (e.g., be disposed in, be provided in, etc.) a locked state when middle portion 63a of clip 60a is parallel with base plate 20a and movement of each portion of clip 60a is obstructed by structures of base plate 20a (e.g., first tab 31a, second tab 32a, third tab 33a, fourth tab 34a, step 35a, etc.). Coupler 1a may comprise a locked state when first portion 61a overlaps first tab 31a, second portion 62a overlaps second tab 32a, and middle portion 63a overlaps each of third tab 33a and fourth tab 34a.

In various embodiments, in a locked state, first portion 61a may overlap first tab 31a and be disposed adjacent fifth end 45a of step 35a (e.g., fifth end 45a). In a locked state, first tab 31a may be configured to engage first portion 61a, thereby limiting translation of first portion 61a in a direction toward first tab 31a. In a locked state, first tab 31a may engage first portion 61a in a first translational direction, thereby limiting translation of clip 60a in the first translational direction. First portion 61a may partially encircle first tab 31a in the locked state of coupler 1. For example, first portion 61a may encircle first tab 31a in at least three perpendicular directions about first tab 31a. First tab 31a may be received through first portion 61a in the locked state.

In various embodiments, in a locked state, fifth end 45a of step 35a may be configured to engage first portion 61a, thereby limiting translation of first portion 61a in a direction toward fifth end 45a. In a locked state, fifth end 45a of step 35 may engage first portion 61a in a second translational direction, thereby limiting translation of clip 60a in the second translational direction. The second translational direction may be perpendicular to the first translational direction.

In various embodiments, in a locked state, second portion 62a may overlap second tab 32a, and be adjacent second wall 22a. In a locked state, second tab 32a may be configured engage second portion 62a, thereby limiting translation of clip 60a in a direction toward second tab 32a. In a locked state, second tab 32a may be configured to engage second portion 62a in a third translational direction, thereby limiting translation of clip 60a in the third translational direction. The third translational direction may be normal to second tab 32a. The third translational direction may be equal to the first translational direction. Second portion 62a may partially encircle second tab 32a in the locked state of coupler 1a. For example, second portion 62a may encircle second tab 32a in at least three perpendicular directions about second tab 32a. Second tab 32a may be received through second portion 62a in the locked state.

In a locked state, second wall 22a of base plate 20a may be configured to engage second portion 62a in a fourth translational direction, thereby preventing translation of clip 60a in the fourth translational direction. The fourth translational direction may be perpendicular to the third translational direction and/or perpendicular to second wall 22a.

In various embodiments, in a locked state, middle portion 63a may be adjacent third tab 33a, fourth tab 34a, third wall 23a, and/or fourth wall 24a. In a locked state, middle portion 63a may overlap third tab 33a. Third tab 33a may be configured to engage middle portion 63a, thereby limiting translation of middle portion 63a in a direction toward third tab 33a. In a locked state, third tab 33a may be configured to engage middle portion 63a in a fifth translational direction, thereby limiting translation of clip 60a in the fifth translational direction. The fifth translational direction may be normal to third tab 33a. Third tab 33a may be configured to engage clip 60a in a direction opposite that of first tab 31a and/or second tab 32a.

In various embodiments, in a locked state, fourth tab 34a may be configured to engage middle portion 63a, thereby limiting translation of middle portion 63a in a direction toward fourth tab 34a. In a locked state, fourth tab 34a may be configured to engage middle portion 63a in a sixth translational direction, thereby limiting translation of clip 60a in the sixth translational direction. The sixth translational direction may be normal to fourth tab 34a. The sixth translational direction may be equal to the fifth translational direction. Fourth tab 34a may be configured to engage clip 60a in a direction opposite that of first tab 31a and/or second tab 32a.

In various embodiments, in a locked state, third wall 23a may be configured to engage middle portion 63a, thereby preventing translation of middle portion 63a beyond third wall 23a. In a locked state, third wall 23a and fourth wall 24a may each be configured to engage middle portion 63a in opposite directions, thereby limiting translation of middle portion 63a relative to third wall 23a and fourth wall 24a. Third wall 23a may engage middle portion 63a in a seventh translational direction, thereby preventing translation of clip 60a in the seventh translational direction. The seventh translational direction may be perpendicular to third wall 23a. In a locked state, fourth wall 24a may be configured to engage middle portion 63a in an eighth translational direction, thereby limiting translation of clip 60a in the eighth translational direction relative to base plate 20a. The eighth translational direction may be perpendicular to fourth wall 24a. The eighth translational direction may be opposite the seventh translational direction.

In various embodiments, an accessory (e.g., camera 3) engaged with mount interface 28a may be configured to engage first portion 61a and/or second portion 62a to further limit movement of clip 60a. An accessory engaged with coupler 1a may secure clip 60a to base plate 20a, such that clip 60a may be unable to decouple from base plate 20a without first removing the accessory. When a provided accessory is coupled to a base plate, a surface of the accessory may be flush or close to flush with step 35a, such that the provided accessory prevents first portion 61a from overlapping step 35a. An item coupled with base plate 20a may lock (e.g., secure) coupler 1a to an article of wear by preventing first portion 61a from overlapping step 35a. Clip 60a may be prevented from being disengaged from base plate 20a if first portion 61a cannot overlap step 35a. Rotation of claim 60a relative to base plate 20a may be precluded in direction opposite an upper surface of first tab 31a. An accessory coupled with coupler 1a via base plate 20a may prevent clip 60a from disengaging base plate 20a. An accessory coupled with coupler 1a via base plate 20a may fully constrain clip 60a to base plate 20a.

Referring to FIG. 4B, clip 60b may be configured to move about base plate 20b to transition from the locked state (e.g., coupler 1a of FIG. 4A) to the unlocked state (e.g., coupler 1c of FIG. 4C). In the transition state, first portion 61b may be configured to overlap step 35b, thereby freeing second portion 62b from engagement with second tab 32b. In accordance with first portion 61b overlapping step 35b, second portion 62b may no longer overlap second tab 32b. In the transition state, first portion 61b may encircle both step 35b and first tab 31b. Both step 35b and first tab 31b may be received through first portion 61b of clip 60b in the transition state. In contrast, and in a locked state of coupler 1b (e.g., as shown for coupler 1a of FIG. 4A), an accessory coupled with base plate 20b (e.g., via mount interface 28b) may be configured to prevent first portion 61b from overlapping step 35b. Decoupling the accessory from base plate 20b may enable movement of clip 60b relative to base plate 20b.

In various embodiments, in a transition state, clip 60b may be less constrained relative to base plate 20b compared with clip 60a. In the transition state, translation of clip 60b relative to base plate 20b may be limited in fewer translational directions than a locked state (e.g., as illustrated with respect to coupler 1a) but remain constrained in more translational directions than an unlocked state (e.g., as illustrated with respect to coupler 1c). For example, first portion 61b may be rotated away from an upper surface of first tab 31b. First portion 61b may also be further translated in a direction toward second tab 32b. In the transition state, and in accordance with a movement (e.g., rotation, translation, etc.) of clip 60b, step 35b may be encircled by first portion 61a. Clip 60b may be rotated and translated relative to base plate 20b to free second portion 62b from second tab 32b. First portion 61b may overlap step 35b to enable second portion 62b to be freed from second tab 32b. Once second portion 62b is free of second tab 32b, clip 60b may be able to be decoupled from base plate 20b by translating clip 60b in a direction toward first tab 31b. In the transition state, clip 60b may overlap one or more structures of base plate 20b, but not central a region of base plate 20b. One or more structures of base plate 20b may prevent clip 60b from encircling the central region of base plate 20b in the transition state. One or more structures of base plate 60b may further physically prevent clip 60b from encircling the central region in the locked state of coupler 1b (e.g., as illustrated with respect to coupler 1a).

Referring to FIG. 4C, coupler 1c is shown in an unlocked state. In the unlocked state, first portion 61c may be free of (e.g., not overlap) first tab 31c, step 35c, and second portion 62c may be free of second tab 32c, thereby decoupling clip 60c from base plate 20c. In the unlocked state, clip 60c may no longer be constrained relative to base plate 20c. In the unlocked state, translation of clip 60c relative to base plate 20c may be limited in fewer translational directions than a locked state (e.g., as illustrated with respect to coupler 1a) and fewer translational directions than a transition state (e.g., as illustrated with respect to coupler 1b). Third portion 63c may no longer be interlocked with third tab 33c and fourth tab 34c, thereby enabling clip 60c to be decoupled from base plate 20c.

In various embodiments, a clip may engage a base plate in a series of actions. The series of actions may comprise overlapping a first portion of the clip with a first tab of the base plate, rotating the clip relative to the base plate to overlap a third portion of the clip with a third tab and/or fourth tab of the base plate, and sliding (e.g., translating) the clip relative to the base plate to overlap a second portion of the clip with a second tab of the base plate, such that each of the portions of the clip are engaged with (e.g., interlocked with) one or more respective tabs of the base plate. To further secure the clip to the base plate, an accessory may be coupled to the base plate to prevent the clip from decoupling with the base plate. The series of actions may be repeated in reverse to disengage the clip from the base plate. The series of actions for disengaging the clip from the base plate may improve the reliability of a coupler in reliably coupling to an article of wear. The series of actions for disengaging the clip from the base plate may reduce the likelihood of the clip in unintentionally being decoupled from the base plate. The series of actions for disengaging a coupler coupled to an article of wear may reduce the likelihood of the coupler in being unintentionally decoupled from the article of wear.

Aspects of this disclosure may relate to a coupler apparatus, methods, and systems thereof. A first example embodiment of a coupler for releasably coupling to an article of wear may comprise a base plate and a clip. The base plate may extend between a first wall and second wall opposite the first wall. The base plate may extend along a third wall and a fourth wall opposite the third wall. The base plate may include a first tab extending from the first wall to a first end, a second tab extending from the second wall to a second end, a third tab extending from the third wall, and a step. The step may be adjacent the first wall and the first tab. The clip may be formed of a loop and comprise a first portion, a second portion, and a middle portion connecting the first portion and the second portion. The clip may be configured to engage the base plate over a provided article of wear by: overlapping the first portion of the clip with the step, sliding the clip toward the first end of the first tab; and rotating the clip to overlap the first portion of the clip with the first tab, the second portion of the clip with the second tab, and the middle portion of the clip with the third tab to couple the clip with the base plate.

A second example embodiment of a coupler for releasably securing a provided accessory with a provided article of wear may comprise a base plate and a clip. The base plate may extend from a first wall to a second wall opposite the first wall, along a third wall and a fourth wall opposite the third wall and comprise a first structure extending from the first wall, a second structure extending from the second wall, and a surface coupled to the central region. The clip may be formed of a loop and comprise a first portion connected to a second portion by a middle portion. The clip may be configured to couple with the base plate over a provided article of wear. In a locked state of the coupler, the first portion of the clip may be configured to engage the first structure of the base plate in a first translational direction, thereby limiting translation of the clip in the first translational direction relative to the base plate; the second portion of the clip may be configured to engage the second structure of the base plate in the first translational direction, thereby limiting translation of the clip in the first translational direction relative to the base plate; and the middle portion of the clip may be configured to engage the surface in a second translational direction, the third wall in a third translational direction, and the fourth wall in a fourth translational direction, thereby limiting translation of the clip in the second translational direction, the third translational direction, and the fourth translational direction relative to the base plate.

A third example embodiment of a coupler may include the coupler as in any of the preceding example embodiments where the step comprises a first step end proximate the first end of the first tab; and a length from the second end of the second tab to the first step end of the step is less than an internal length between the first portion of the clip and the second portion of the clip.

A fourth example embodiment of a coupler may include the coupler as in any of the preceding example embodiments where a length from the first wall of the base plate to the second wall of the base plate is less than an internal length between the first portion of the clip and the second portion of the clip.

A fifth example embodiment of a coupler may include the coupler as in any of the preceding example embodiments where the base plate comprises a fourth tab extending from the fourth wall of the base plate; and the middle portion of the clip is further configured to engage the base plate over the provided article of wear by rotating the clip to overlap the middle portion of the clip with the fourth tab to couple the clip to the base plate.

A sixth example embodiment of a coupler may include the coupler as in any of the preceding example embodiments where the third tab terminates in a third end; the fourth tab terminates in a fourth end; and a width of the base plate between the third end and the fourth end is greater than an internal width of the middle portion of the clip.

A seventh example embodiment of a coupler may include the coupler as in any of the preceding example embodiments where the first portion of the clip is tangent with a first plane; the second portion of the clip is tangent with a second plane; and the first plane and the second plane intersect.

An eighth example embodiment of a coupler may include the coupler as in any of the preceding example embodiments where the third portion of the clip is tangent with a third plane; and the first plane, the second plane, and the third plane are orthogonal to a fourth plane.

A ninth example embodiment of a coupler may include the coupler as in any of the preceding example embodiments where the clip comprises a closed loop.

A tenth example embodiment of a coupler may include the coupler as in any of the preceding example embodiments where the first structure comprises a first undercut structure; the second structure comprises a second undercut structure; and the base plate further comprises an overhanging structure extending from the third tab, and wherein the surface is disposed on the overhanging structure.

An eleventh example embodiment of a coupler may include the coupler as in any of the preceding example embodiments where the base plate further comprises a step adjacent to both the first structure and the first wall; the step terminates in a first step end; and a length from the first step end to the second wall of the base plate is less than an internal length from the first portion of the clip to the second portion of the clip.

A twelfth example embodiment of a coupler may include the coupler as in any of the preceding example embodiments where the first structure terminates in a first end; the second structure terminates in a second end; a length from the first end to the second end is greater than an internal length from the first portion of the clip to the second portion of the clip; and a width of the base plate is greater than a width of the third portion of the clip.

A thirteenth example embodiment of a coupler may include the coupler as in any of the preceding example embodiments where the second translational direction is opposite the first translational direction.

A fourteenth example embodiment of a coupler may include the coupler as in any of the preceding example embodiments where the base plate further comprises a third structure comprising the surface; and a fourth structure extending from the fourth wall of the base plate, and wherein the middle portion of the clip is configured to engage the fourth structure of the base plate in the second translational direction.

A fifteenth example embodiment of a coupler may include the coupler as in any of the preceding example embodiments where the base plate further comprises a mount interface configured to receive the provided accessory in direction parallel to the first translational direction.

A sixteenth example embodiment of a coupler may include the coupler as in any of the preceding example embodiments where the clip is geometrically formed by sweeping a closed profile about a curve.

A seventeenth example embodiment of a coupling system for releasably securing a body camera to a provided article of wear may comprise the body camera, a base plate, and a clip. The base plate may extend from a first wall to a second wall along a third wall and a fourth wall and include a first tab extending from the first wall to a first end; a second tab extending from the second wall to a second end; a third tab extending from the third wall; and a step, the step adjacent the first wall and the first tab. The clip may be formed of a loop and include a first portion, a second portion, and a middle portion connecting the first portion and the second portion. The clip may be configured to engage the base plate over the provided article of wear by: overlapping the first portion of the clip with the step; sliding the clip toward the first end of the first tab; and rotating the clip to overlap the first portion of the clip with the first tab, the second portion of the clip with the second tab, and the middle portion of the clip with the third tab. The body camera may be configured to prevent the clip from decoupling from the base plate upon attaching of the body camera to the base plate.

An eighteenth example embodiment of a coupling system may include the coupling system as in any of the preceding example embodiments where the base plate comprises a fourth tab extending from the fourth wall of the base plate, and the middle portion of the clip is engageable with the base plate by rotating the clip to overlap each of the third tab and the fourth tab.

A nineteenth example embodiment of a coupling system may include the coupling system as in any of the preceding example embodiments where the clip and the base plate are each formed of a rigid material.

A twentieth example embodiment of a coupling system may include the coupling system as in any of the preceding example embodiments where a length between the first wall of the base plate and the second end of the second tab is less than an internal length between the first portion of the clip and the second portion of the clip.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". A person of ordinary skill in the art will appreciate that this disclosure includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A coupler for releasably coupling to a provided article of wear, the coupler comprising:
    a base plate extending between a first wall and a second wall opposite the first wall, along a third wall and a fourth wall opposite the third wall, the base plate including:
        a first tab extending from the first wall to a first end;
        a second tab extending from the second wall to a second end;
        a third tab extending from the third wall; and
        a step, the step adjacent the first wall and the first tab; and
    a clip formed of a loop, the clip comprising a first portion, a second portion, and a middle portion connecting the first portion and the second portion, wherein:
    the clip is configured to engage the base plate over the provided article of wear by:
        overlapping the first portion of the clip with the step, sliding the clip toward the first end of the first tab; and
        rotating the clip to overlap the first portion of the clip with the first tab, the second portion of the clip with the second tab, and the middle portion of the clip with the third tab to couple the clip with the base plate.

2. The coupler of claim 1 wherein:
    the step comprises a first step end proximate the first end of the first tab; and
    a length from the second end of the second tab to the first step end of the step is less than an internal length between the first portion of the clip and the second portion of the clip.

3. The coupler of claim 1 wherein:
a length from the first wall of the base plate to the second wall of the base plate is less than an internal length between the first portion of the clip and the second portion of the clip.

4. The coupler of claim 1 wherein:
the base plate comprises a fourth tab extending from the fourth wall of the base plate; and
the middle portion of the clip is further configured to engage the base plate over the provided article of wear by rotating the clip to overlap the middle portion of the clip with the fourth tab to couple the clip to the base plate.

5. The coupler of claim 4 wherein:
the third tab terminates in a third end;
the fourth tab terminates in a fourth end; and
a width of the base plate between the third end and the fourth end is greater than an internal width of the middle portion of the clip.

6. The coupler of claim 1 wherein:
the first portion of the clip is tangent with a first plane;
the second portion of the clip is tangent with a second plane; and
the first plane and the second plane intersect.

7. The coupler of claim 6 wherein:
the middle portion of the clip is tangent with a third plane; and
the first plane, the second plane, and the third plane are orthogonal to a fourth plane.

8. The coupler of claim 1 wherein the clip comprises a closed loop.

9. A coupler for releasably securing a provided accessory with a provided article of wear, the coupler comprising:
a base plate extending from a first wall to a second wall opposite the first wall, along a third wall and a fourth wall opposite the third wall, the base plate comprising a first structure extending from the first wall, a second structure extending from the second wall, and a surface coupled to a central region; and
a clip formed of a loop, the clip comprising a first portion connected to a second portion by a middle portion, the clip configured to couple with the base plate over the provided article of wear; wherein in a locked state of the coupler:
the first portion of the clip is configured to engage the first structure of the base plate in a first translational direction, thereby limiting translation of the clip in the first translational direction relative to the base plate;
the second portion of the clip is configured to engage the second structure of the base plate in the first translational direction, thereby limiting translation of the clip in the first translational direction relative to the base plate; and
the middle portion of the clip is configured to engage the surface in a second translational direction, the third wall in a third translational direction, and the fourth wall in a fourth translational direction, thereby limiting translation of the clip in the second translational direction, the third translational direction, and the fourth translational direction relative to the base plate.

10. The coupler of claim 9 wherein:
the first structure comprises a first undercut structure;
the second structure comprises a second undercut structure; and
the base plate further comprises an overhanging structure extending from the third tab, and wherein the surface is disposed on the overhanging structure.

11. The coupler of claim 9 wherein:
the base plate further comprises a step adjacent to both the first structure and the first wall;
the step terminates in a first step end; and
a length from the first step end to the second wall of the base plate is less than an internal length from the first portion of the clip to the second portion of the clip.

12. The coupler of claim 9 wherein:
the first structure terminates in a first end;
the second structure terminates in a second end;
a length from the first end to the second end is greater than an internal length from the first portion of the clip to the second portion of the clip; and
a width of the base plate is greater than a width of the middle portion of the clip.

13. The coupler of claim 9 wherein:
the second translational direction is opposite the first translational direction.

14. The coupler of claim 9 wherein the base plate further comprises:
a third structure comprising the surface; and
a fourth structure extending from the fourth wall of the base plate, and wherein the middle portion of the clip is configured to engage the fourth structure of the base plate in the second translational direction.

15. The coupler of claim 9 wherein the base plate further comprises a mount interface configured to receive the provided accessory in a direction parallel to the first translational direction.

16. The coupler of claim 9 wherein the clip is geometrically formed by sweeping a closed profile about a curve.

17. A coupling system for releasably securing a body camera to a provided article of wear, the coupling system comprising:
the body camera;
a base plate extending from a first wall to a second wall along a third wall and a fourth wall, the base plate including:
a first tab extending from the first wall to a first end;
a second tab extending from the second wall to a second end;
a third tab extending from the third wall; and
a step, the step adjacent the first wall and the first tab; and
a clip, the clip formed of a loop, the clip including a first portion, a second portion, and a middle portion connecting the first portion and the second portion, wherein:
the clip is configured to engage the base plate over the provided article of wear by:
overlapping the first portion of the clip with the step;
sliding the clip toward the first end of the first tab; and
rotating the clip to overlap the first portion of the clip with the first tab, the second portion of the clip with the second tab, and the middle portion of the clip with the third tab; and wherein the body camera is configured to prevent the clip from decoupling from the base plate upon attaching of the body camera to the base plate.

18. The coupling system of claim 17 wherein the base plate comprises a fourth tab extending from the fourth wall of the base plate, and the middle portion of the clip is engageable with the base plate by rotating the clip to overlap each of the third tab and the fourth tab.

19. The coupling system of claim 17 wherein the clip and the base plate are each formed of a respective rigid material.

20. The coupling system of claim 17 wherein a length between the first wall of the base plate and the second end of the second tab is less than an internal length between the first portion of the clip and the second portion of the clip.

* * * * *